United States Patent
Ye et al.

(10) Patent No.: US 8,199,812 B2
(45) Date of Patent: Jun. 12, 2012

(54) ADAPTIVE UPSAMPLING FOR SCALABLE VIDEO CODING

(75) Inventors: Yan Ye, San Diego, CA (US); Yiliang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1061 days.

(21) Appl. No.: 11/970,413

(22) Filed: Jan. 7, 2008

(65) Prior Publication Data

US 2008/0165848 A1 Jul. 10, 2008

Related U.S. Application Data

(60) Provisional application No. 60/884,099, filed on Jan. 9, 2007, provisional application No. 60/888,912, filed on Feb. 8, 2007.

(51) Int. Cl.
*H04N 11/02* (2006.01)
(52) U.S. Cl. .......... 375/240.02; 375/240.18; 375/240.24
(58) Field of Classification Search ............. 375/240.02, 375/240.18, 240.23, 240.24
See application file for complete search history.

(56) References Cited

U.S. PATENT DOCUMENTS

| | | | | |
|---|---|---|---|---|
| 2002/0090028 A1* | 7/2002 | Comer et al. | ............... | 375/240.2 |
| 2003/0058931 A1* | 3/2003 | Zhang et al. | ............. | 375/240.01 |
| 2005/0220190 A1* | 10/2005 | Ha et al. | ................... | 375/240.16 |
| 2006/0083308 A1* | 4/2006 | Schwarz et al. | ......... | 375/240.16 |
| 2006/0093036 A1 | 5/2006 | Park et al. | | |
| 2007/0140354 A1* | 6/2007 | Sun | ......................... | 375/240.24 |
| 2007/0160153 A1* | 7/2007 | Sullivan | .................... | 375/240.29 |
| 2008/0055235 A1* | 3/2008 | Tanaka | ........................... | 345/107 |
| 2008/0095235 A1* | 4/2008 | Hsiang | .................... | 375/240.13 |
| 2009/0175333 A1* | 7/2009 | Hsiang | .................... | 375/240.12 |
| 2011/0038421 A1* | 2/2011 | Schwarz et al. | ......... | 375/240.16 |
| 2011/0110432 A1* | 5/2011 | Han et al. | ................. | 375/240.16 |

FOREIGN PATENT DOCUMENTS

| | | |
|---|---|---|
| EP | 1694074 | 8/2006 |
| JP | 2006295913 A | 10/2006 |
| KR | 20060063533 A | 6/2006 |
| KR | 20060080107 | 7/2006 |
| KR | 20070090245 A | 9/2007 |
| RU | 2201654 | 3/2003 |
| RU | 2294058 | 2/2007 |

(Continued)

OTHER PUBLICATIONS

Iain Richardson, Videokodirovanie H.264 and MPEG-4—standarty novogo pokoleniya (H.264 and MPEG-4 Video Coding—new generation standards), Moscow, Tekhnosfera, 2005, pp. 192-197, 219-224.

(Continued)

*Primary Examiner* — Andrew Lee
(74) *Attorney, Agent, or Firm* — Steven Thiel; Brent A. Boyd

(57) ABSTRACT

This disclosure describes techniques for coding information in a scalable video coding (SVC) scheme that supports spatial scalability. In one example, a method for coding video data with spatial scalability comprises upsampling base layer residual video data to a spatial resolution of enhancement layer residual video data, and coding the enhancement layer residual video data based on the upsampled base layer residual video data. In accordance with this disclosure, upsampling base layer residual video data includes interpolating values for one or more pixel locations of the upsampled base layer residual video data that correspond to locations between different base layer residual video data blocks.

32 Claims, 8 Drawing Sheets

FOREIGN PATENT DOCUMENTS

| | | |
|---|---|---|
| WO | WO2006007527 | 1/2006 |
| WO | WO2006058921 | 6/2006 |
| WO | WO2006087314 A1 | 8/2006 |
| WO | WO2006101682 A2 | 9/2006 |
| WO | 2006125713 | 11/2006 |
| WO | WO2007008286 | 1/2007 |

OTHER PUBLICATIONS

Nevdyaev L.M., Telekommunikatsionnie Tekhnologii, Anglo-russkiy tolkovy slovar-spravochnik (Telecommunication Technologies, English-Russian explanatory dictionary and reference book), Svyaz' i Biznes, Moscow, 2002, pp. 103, 136-L.4.

Sun S. et al, Extended Spatial Scalability with picture-level adaptation, Joint Video Team (JVT) of ISO/IEC MPEG & ITU-T VCEG, JVT-O008, 15th Meeting, Busan, Apr. 16-22, 2005.

Yan Ye et al., "JVT-V115" submitted to the JVT Joint Video Team (JVT) of ISO/IEC MPEG & ITU-T VCEG (ISO/IEC JTC1/SC29/WG11 and ITU-T SG16 Q.6). Jan. 2007, Marrakech, Morocco.

Thomas Wiegand et al., "Joint Draft 8 (JD8) of the SVC Amendment (revision 2)," Joint Draft 8 of SVC Amendment (revision 2), JVT-U201, p. 484-485, Oct. 2006.

Yan Ye et al., "JVT-W117" submitted to the Joint Video Team (JVT) of ISO/IEC MPEG & ITU-T VCEG (ISO/IEC JTC1/SC29/WG11 and ITU-T SG16 Q.6). Apr. 2007, San Jose, CA.

ITU-T H.264, "Advanced video coding for generic audiovisual services", Telecommunications Standardization Sector of ITU, Mar. 2005.

Reichel, Julien, et al., "Joint Scalable Video Model (JSVM) 8" Joint Video Team (JVT) of ISO/IEC MPEG & ITU-T VCEG 21st Meeting:Hangzou, China, Oct. 20-27, 2006, No. JVT-U202, Dec. 13, 2006.

TIA-1099, "Forward Link Only Air Interface Specification for Terrestrial Mobile Multimedia Multicast", Telecommunications Industry Assiciation, Aug. 2006.

Wang. Xianglin, "JVT-V302" submitted to the JVT Joint Video Team (JVT) of ISO/IEC MPEG & ITU-T VCEG (ISO/IEC JTC1/SC29/WG11 and ITU-T SG16 Q.6) Jan. 2007, Marrakech, Morocco.

International Search Report—PCT/US08/050546—International Search Authority, European Patent Office—Jun. 27, 2008.

Written Opinion—PCT/US08/050546—International Search Authority, European Patent Office—Jun. 27, 2008.

* cited by examiner

ADAPTIVE UPSAMPLING FOR SCALABLE VIDEO CODING

This application claims the benefit of U.S. provisional application No. 60/884,099, filed Jan. 9, 2007, and U.S. provisional application No. 60/888,912, filed Feb. 8, 2007. The entire content of both provisional applications is incorporated herein by reference.

TECHNICAL FIELD

This disclosure relates to digital video coding and, more particularly, scalable video coding (SVC) techniques that provide spatial scalability.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices may implement block-based video compression techniques, such as those defined by the MPEG-2, MPEG-4, ITU-T H.261, H.263, or H.264/MPEG-4, Part 10, Advanced Video Coding (AVC) standards, to transmit and receive digital video more efficiently. Video compression techniques perform spatial and temporal prediction to reduce or remove redundancy inherent in video sequences.

Spatial prediction reduces redundancy between neighboring video blocks within a given video frame. Temporal prediction, also known as motion estimation and compensation, reduces temporal redundancy between video blocks in past and/or future video frames of a video sequence. For temporal prediction, a video encoder performs motion estimation to track the movement of matching video blocks between two or more adjacent frames. Motion vectors indicate the displacement of video blocks relative to corresponding prediction video blocks in one or more reference frames. Motion compensation uses the motion vectors to identify prediction video blocks from a reference frame. A residual video block is formed by subtracting the prediction video block from the original video block to be coded. The residual video block can be sent to a video decoder along with the motion vector, and the decoder can use this information to reconstruct the original video block or an approximation of the original video block. The video encoder may apply transform, quantization and entropy coding processes to further reduce the bit rate associated with the residual block.

Some video coding makes use of scalable coding techniques, which may be particularly desirable for wireless communication of video data. In general, scalable video coding (SVC) refers to video coding in which a video data is represented by a base layer and one or more enhancement layers. For SVC, a base layer typically carries video data with a base spatial, temporal and/or signal to noise ratio (SNR) level. One or more enhancement layers carry additional video data to support higher spatial, temporal and/or SNR levels.

For spatial scalability, enhancement layers add spatial resolution to frames of the base layer. In SVC systems that support spatial scalability, inter-layer prediction may be used to reduce the amount of data needed to convey the enhancement layer. In inter-layer prediction, enhancement layer video blocks may be coded using predictive techniques that are similar to motion estimation and motion compensation. In particular, enhancement layer video residual data blocks may be coded using reference blocks in the base layer. However, the base and enhancement layers have different spatial resolutions. Therefore, the base layer video data may be upsampled to the spatial resolution of the enhancement layer video data, e.g., to form reference blocks for generation of the enhancement layer residual data.

SUMMARY

In general, this disclosure describes adaptive techniques for upsampling base layer video data to code enhancement layer video data for spatial scalability. For example, base layer video data (e.g., residual base layer video blocks) may be upsampled to a higher resolution, and the upsampled data may be used to code enhancement layer video data. As part of the upsampling process, the techniques of this disclosure identify conditions in which upsampling by interpolation may be preferred, and other situations in which upsampling by so-called "nearest neighbor" copying techniques may be preferred. Hence, to code enhancement layer data, interpolation and nearest neighbor copying techniques may be used in upsampling base layer data on an adaptive basis.

According to certain aspects of this disclosure, either interpolation or nearest neighbor copying may be used to define upsampled data, which may be used as reference blocks in the coding of enhancement layer video data. In particular, the decision whether to perform interpolation or nearest neighbor copying may be based on whether an upsampled pixel corresponds to an edge pixel location in the enhancement layer. Instead of considering only the base layer pixel locations in determining whether to interpolate or use nearest neighbor copying for the upsampling, techniques described in this disclosure may consider upsampled pixel locations relative to block boundaries in the enhancement layer. The block boundaries in the enhancement layer may differ from the block boundaries of the base layer.

In one example, this disclosure provides a method for coding video data with spatial scalability. The method comprises generating upsampled video data based on base layer video data, wherein the upsampled video data corresponds to a spatial resolution of enhancement layer video data, and coding the enhancement layer video data based on the upsampled video data, wherein generating the upsampled video data includes interpolating values for one or more pixel locations of the upsampled video data that correspond to locations between different base layer video blocks defined in the base layer video data.

In another example, this disclosure provides an apparatus that codes video data with spatial scalability, the apparatus being configured to generate upsampled video data based on base layer video data, wherein the upsampled video data corresponds to a spatial resolution of enhancement layer video data, and code the enhancement layer video data based on the upsampled video data, wherein the apparatus interpolates values for one or more pixel locations of the upsampled video data that correspond to locations between different base layer video blocks defined in the base layer video data.

In another example, this disclosure provides a device for coding video data with spatial scalability, the device comprising means for generating upsampled video data based on base layer video data, wherein the upsampled video data corresponds to a spatial resolution of enhancement layer video data, and means for coding the enhancement layer video data based on the upsampled video data, wherein means for generating the upsampled video data includes means for interpolating values for one or more pixel locations of the upsampled video data that correspond to locations between different base layer video blocks defined in the base layer video data.

The techniques described in this disclosure may be implemented in hardware, software, firmware, or any combination thereof. If implemented in software, the software may be executed in a processor, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a processor cause the processor to code video data with spatial scalability, wherein the instructions cause the processor to generate upsampled video data based on base layer video data, wherein the upsampled video data corresponds to a spatial resolution of enhancement layer video data, and code the enhancement layer video data based on the upsampled video data, wherein generating the upsampled video data includes interpolating values for one or more pixel locations of the upsampled video data that correspond to locations between different base layer video blocks defined in the base layer video data.

In other cases, this disclosure may be directed to a circuit, such as an integrated circuit, chipset, application specific integrated circuit (ASIC), field programmable gate array (FPGA), logic, or various combinations thereof configured to perform one or more of the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
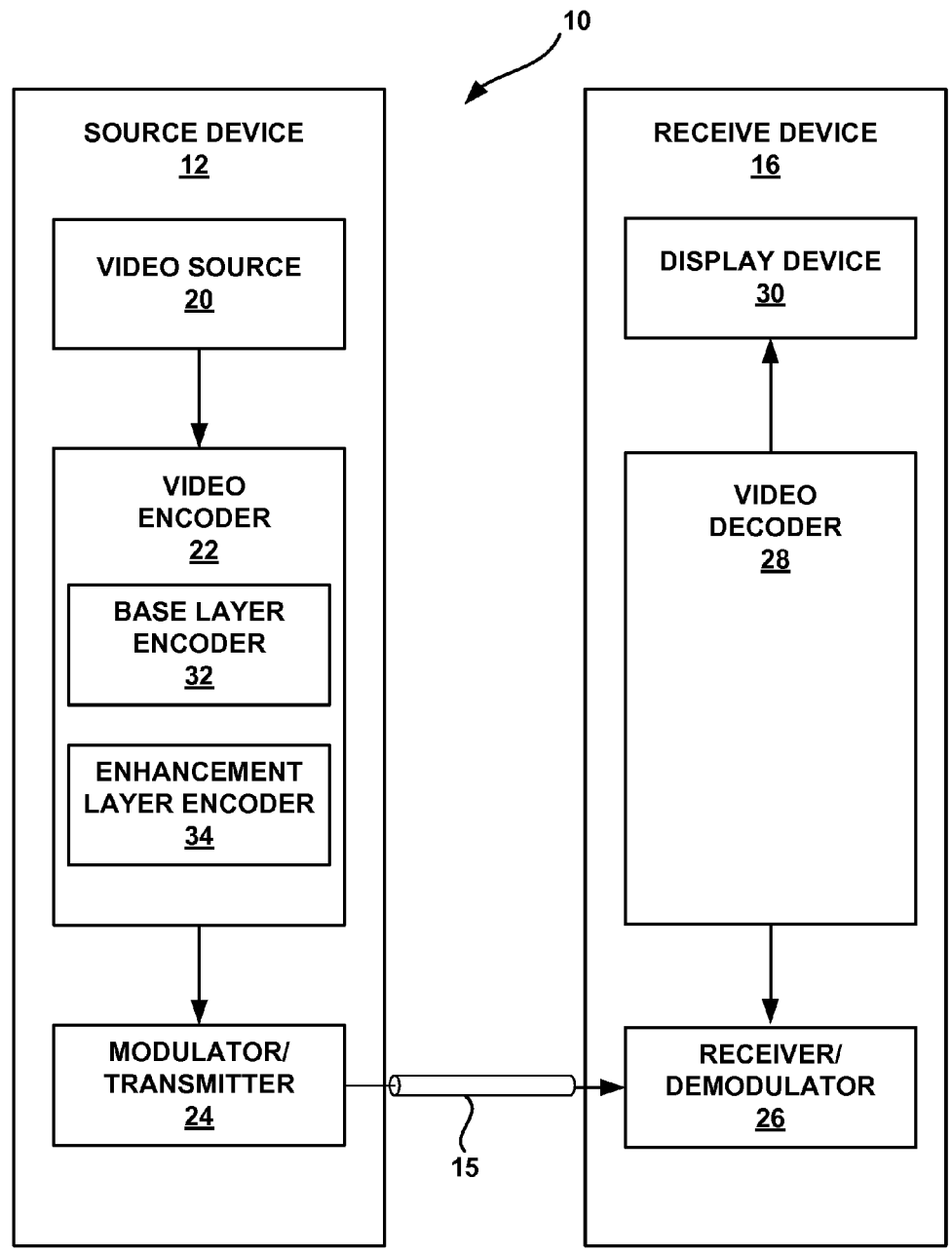
FIG. 1 is an exemplary block diagram illustrating a video encoding and decoding system that may implement the coding techniques described herein as part of the encoding and/or decoding process.

This disclosure describes upsampling techniques useful in coding (i.e., encoding or decoding) enhancement layer video blocks in a scalable video coding (SVC) scheme. In SVC schemes that support spatial scalability, base layer video data (e.g., residual video blocks of a base layer) may be upsampled to higher resolution, and the higher resolution upsampled data may be used to code the enhancement layer video data (e.g., residual video blocks of an enhancement layer). In particular, the upsampled data is used as reference data in the coding of enhancement layer video data relative to the base layer. That is to say, the base layer video data is upsampled to the spatial resolution of the enhancement layer video data, and the resulting upsampled data is used to code the enhancement layer video data.

As part of this upsampling process, the techniques of this disclosure identify conditions for which upsampling by interpolation is preferred, and other conditions for which upsampling by so-called "nearest neighbor" copying techniques are preferred. Interpolation may involve the generation of a weighted average for an upsampled value, wherein the weighted average is defined between two or more pixel values of the base layer. For nearest neighbor techniques, the upsampled value is defined as that of the pixel location in the base layer that is in closest spatial proximity to the upsampled pixel location. According to this disclosure, by using interpolation for some specific conditions of the upsampling, and nearest neighbor copying for other conditions, the coding of enhancement layer video blocks may be improved.

Either interpolation or nearest neighbor copying may be used to define upsampled data at the spatial resolution of the enhancement layer. The upsampled data may be upsampled from base layer data (e.g., from residual video blocks coded in the base layer). The upsampled data may form blocks that can be used as references in the coding of enhancement layer data (e.g., in coding residual video blocks of the enhancement layer). The decision whether to perform interpolation or nearest neighbor copying during the upsampling process may be based on whether the location of the upsampled pixel value corresponds to an edge pixel location in the enhancement layer. This contrasts with conventional upsampling techniques, which generally consider only the base layer pixel locations in determining whether to interpolate or use nearest neighbor copying.

For example, conventional upsampling techniques may perform interpolation of an upsampled pixel only when two base layer pixels used for the interpolation do not correspond to an edge of a base layer video block. In this disclosure, the term "edge" refers to pixel locations that correspond to an edge of a video block, and the term "internal" refers to pixel locations that do not correspond to an edge of a video block. A video block may refer to the block transform used in the video encoder-decoder (CODEC). As examples in H.264/AVC, a video block may be of size 4×4 or 8×8. The block boundaries in the enhancement layer, however, may differ from the block boundaries of the base layer. According to this disclosure, the decision whether to perform interpolation may depend on whether the pixel value to be upsampled corresponds to an edge pixel location in the enhancement layer.

If the two base layer pixels used for interpolation correspond to edges of two adjacent base layer video blocks, the upsampled value may fall between the two adjacent base layer video blocks. In this case, conventional techniques use nearest neighbor copying techniques for upsampling. Interpolation is conventionally avoided in this case because the different base layer video blocks may have been coded with different levels of quantization. For nearest neighbor copying, the upsampled value may be defined as that of the base layer pixel location in closest spatial proximity to the upsampled pixel location.

According to this disclosure, interpolation may be performed in several contexts where an upsampled layer value falls between two base layer video blocks. If the upsampled value would not itself be associated with an edge pixel location in the enhancement layer, interpolation may be preferred to nearest neighbor copying. In this case, de-block filtering of the enhancement layer will not likely address any blockiness artifacts in the video frame reproduction. Therefore, interpolation may be preferred even though the different base layer video blocks may have been coded with different levels of quantization. If the upsampled value is itself associated with an edge pixel location in the enhancement layer, and the upsampled value falls between the two base layer video blocks, then nearest neighbor copying may be used in accordance with this disclosure. In this case, de-block filtering of the enhancement layer will address blockiness artifacts in the enhancement layer, and the risk of poor interpolation due to the base layer video blocks having different levels of quantization may outweigh potential benefits of interpolation in this context. In addition, the decision whether to interpolate or use nearest neighbor copying may also depend on whether the two base layer video blocks were coded via different coding modes (e.g., intra or inter coding modes). For example, nearest neighbor copying may be used and interpolation avoided if the two base layer video blocks were coded via different coding modes. Furthermore, optional adaptive low-pass filters may be applied before or after upsampling to further alleviate the problem of signal discontinuity across base layer coding block boundaries.

For simplicity and ease of illustration, in this disclosure, interpolation and nearest neighbor copying techniques are generally described in one-dimension, although such techniques would typically apply to both the vertical and horizontal dimensions. For two-dimensional interpolation or two-dimensional nearest neighbor techniques, the interpolation or nearest neighbor copying would first be applied in one dimension, and then would be applied in the other dimension.

FIG. 1 is a block diagram illustrating a video encoding and decoding system 10. As shown in FIG. 1, system 10 includes a source device 12 that transmits encoded video to a receive device 16 via a communication channel 15. Source device 12 may include a video source 20, video encoder 22 and a modulator/transmitter 24. Receive device 16 may include a receiver/demodulator 26, video decoder 28, and display device 30. System 10 may be configured to apply adaptive upsampling techniques, as described herein, during the encoding and decoding of enhancement layer video information of an SVC scheme. Encoding and decoding is more generally referred to herein as coding.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium or collection of different communication media for transmitting video data from source device 12 to receive device 16.

Source device 12 generates coded video data for transmission to receive device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video and computer-generated video. In some cases, if video source 20 is a video camera, source device 12 and receive device 16 may form so-called camera phones or video phones. In each case, the captured, pre-captured or computer-generated video may be encoded by video encoder 22 for transmission from video source device 12 to video decoder 28 of video receive device 16 via modulator/transmitter 22, communication channel 15 and receiver/demodulator 26.

The video encoding and decoding processes may implement adaptive upsampling techniques using interpolation and nearest neighbor copying, as described herein, to improve the enhancement layer coding process. Display device 30 displays the decoded video data to a user, and may comprise any of a variety of display devices such as a cathode ray tube, a liquid crystal display (LCD), a plasma display, an organic light emitting diode (OLED) display, or another type of display device. Spatial scalability allows a video decoder to reconstruct and display a video signal of higher spatial resolution, e.g., CIF (Common intermediate format, 352×288 image resolution) as opposed to QCIF (Quarter common intermediate format, 176×144 image resolution)) by decoding enhancement layer bitstream from an SVC bitstream.

Video encoder 22 and video decoder 28 may be configured to support scalable video coding (SVC) for spatial scalability. In addition, temporal and/or signal-to-noise ratio (SNR) scalability may also be supported, although the techniques of this disclosure are not limited in this respect. In some aspects, video encoder 22 and video decoder 28 may be configured to support fine granularity SNR scalability (FGS) coding for SVC. Encoder 22 and decoder 28 may support various degrees of scalability by supporting encoding, transmission and decoding of a base layer and one or more scalable enhancement layers. For scalable video coding, a base layer carries video data with a baseline spatial, temporal or SNR level. One or more enhancement layers carry additional data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers.

In order to support SVC, video encoder 22 may include a base layer encoder 32 and an enhancement layer encoder 34 to perform encoding of a base layer and the enhancement layer, respectively. In some cases, multiple enhancement layers may be supported, in which case, multiple enhancement layer encoders may be provided to code progressively detailed levels of video enhancement. The techniques of this disclosure, which involve upsampling of base layer data to the spatial resolution of enhancement layer video data so that the upsampled data may be used to code enhancement layer data, may be performed by enhancement layer encoder 34.

Video decoder 28 may comprise a combined base/enhancement decoder that decodes the video blocks associated with both base and enhancement layers, and combines the decoded video to reconstruct the frames of a video sequence. On the decoding side, the techniques of this disclosure, which involve upsampling of base layer data to the spatial resolution of enhancement layer video data so that the upsampled data may be used to code enhancement layer data, may be performed by video decoder 28. Display device 30 receives the decoded video sequence, and presents the video sequence to a user.

Video encoder 22 and video decoder 28 may operate according to a video compression standard, such as MPEG-2, MPEG-4, ITU-T H.263, or ITU-T H.264/MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for Generic Audiovisual Services, by the ITU-T Study Group, and dated March, 2005, which may be referred to herein as the H.264 standard or H.264 specification, or the H.264/AVC standard or specification.

The Joint Video Team (JVT) continues to work on scalable video coding (SVC) extensions to H.264/MPEG-4 AVC. For example, the Joint Scalable Video Model (JSVM) created by the JVT implements tools for use in scalable video, which may be used within system 10 for various coding tasks described in this disclosure. Detailed information concerning Fine Granularity SNR Scalability (FGS) coding can be found in the Joint Draft documents, and particularly in Joint Draft 8 (JD8) of the SVC Amendment (revision 2), Thomas Wiegand, Gary Sullivan, Julien Reichel, Heiko Schwarz, and Mathias Wien, "Joint Draft 8 of SVC Amendment (revision 2)", JVT-U201, October 2006, Hangzhou, China. Also, additional details of one implementation of the techniques described herein may be found in proposal document JVT-W117 submitted to the Joint Video Team (JVT) of ISO/IEC MPEG & ITU-T VCEG (ISO/IEC JTC1/SC29/WG11 and ITU-T SG16 Q.6) by Yan Ye and Yiliang Bao in April of 2007 at the $23^{rd}$ Meeting in San Jose, Calif., USA, and in proposal document JVT-V115 submitted to the JVT by Yan Ye and Yiliang Bao in January of 2007 at the $22^{nd}$ Meeting in Marrakech, Morocco.

In some aspects, for video broadcasting, the techniques described in this disclosure may be applied to enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast).

Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive devices, each of which may be similar to receive device 16 of FIG. 1. As an example, receive device 16 may comprise a wireless communication device, such as a mobile handset commonly referred to as a cellular radiotelephone.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In addition, source device 12 and receive device 16 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 24 of source device 12 and receiver/demodulator 26 of receive device 16 in FIG. 1.

A video sequence includes a series of video frames. Video encoder 22 operates on blocks of pixels within individual video frames in order to encode the video data. The video blocks may have fixed or varying sizes, and may differ in size according to a specified coding standard. Each video frame may be divided into a series of slices. Each slice may include a series of macroblocks, which may be arranged into sub-blocks. As an example, the ITU-T H.264 standard supports intra prediction in various block sizes, such as 16 by 16, 8 by 8, 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations of a video frame that include higher levels of detail. In general, macroblocks (MBs) and the various sub-blocks may be generally referred to as video blocks. In addition, a slice may be considered to be a series of video blocks, such as MBs and/or sub-blocks. Each slice may be an independently decodable unit. After prediction, a transform may be performed on the 8×8 residual block or 4×4 residual block, and an additional transform may be applied to the DC coefficients of the 4×4 blocks for chroma components or luma component if the intra 16×16 prediction mode is used.

Following intra- or inter-based predictive coding, additional coding techniques may be applied to the transmitted bitstream. These additional coding techniques may include transformation techniques such as the 4×4 or 8×8 integer transform used in H.264/AVC or a discrete cosine transformation DCT, and entropy coding such as variable length coding (VLC), Huffman coding, and/or run-length coding.

According to the techniques of this disclosure, upsampling techniques are used to produce upsampled video data for use in coding (i.e., encoding or decoding) of enhancement layer video data. The base layer video data may be upsampled to the spatial resolution of corresponding enhancement layer video blocks, and the upsampled data can be used as references in the coding of the enhancement layer video data. As part of this upsampling process, the techniques of this disclosure identify situations in which interpolation techniques are preferred, and other situations in which so-called "nearest neighbor" copying techniques are preferred. Again, interpolation may involve the generation of a weighted average for an upsampled value, wherein the weighted average is defined between two or more values of the base layer. For nearest neighbor copying, the upsampled layer value is defined as that of the base layer pixel location in closest spatial proximity to the upsampled pixel location. By using interpolation in specific scenarios of the upsampling, and nearest neighbor copying in other scenarios, the coding of enhancement layer video blocks may be improved.

The upsampling can change the block boundaries. For example, if the base layer and the enhancement layer each define 4 by 4 pixel video blocks, upsampling of the base layer to define more pixels according to the spatial resolution of the enhancement layer results in the block boundaries of the base layer being different than those of the upsampled data. This observation can be exploited such that decisions regarding interpolation or nearest neighbor techniques may be based on whether the upsampled values correspond to edge pixel locations of the enhancement layer (i.e., block boundaries in the enhancement layer) and whether such locations also correspond to locations between block boundaries of the base layer.

Encoder 22 and decoder 28 may perform reciprocal methods that each performs the upsampling techniques described herein. Encoder 22 may use the upsampling to encode the enhancement layer information, and decoder 28 may use the same upsampling process to decode the enhancement layer information. The term coding generally refers to either encoding or decoding.

Figure 2:
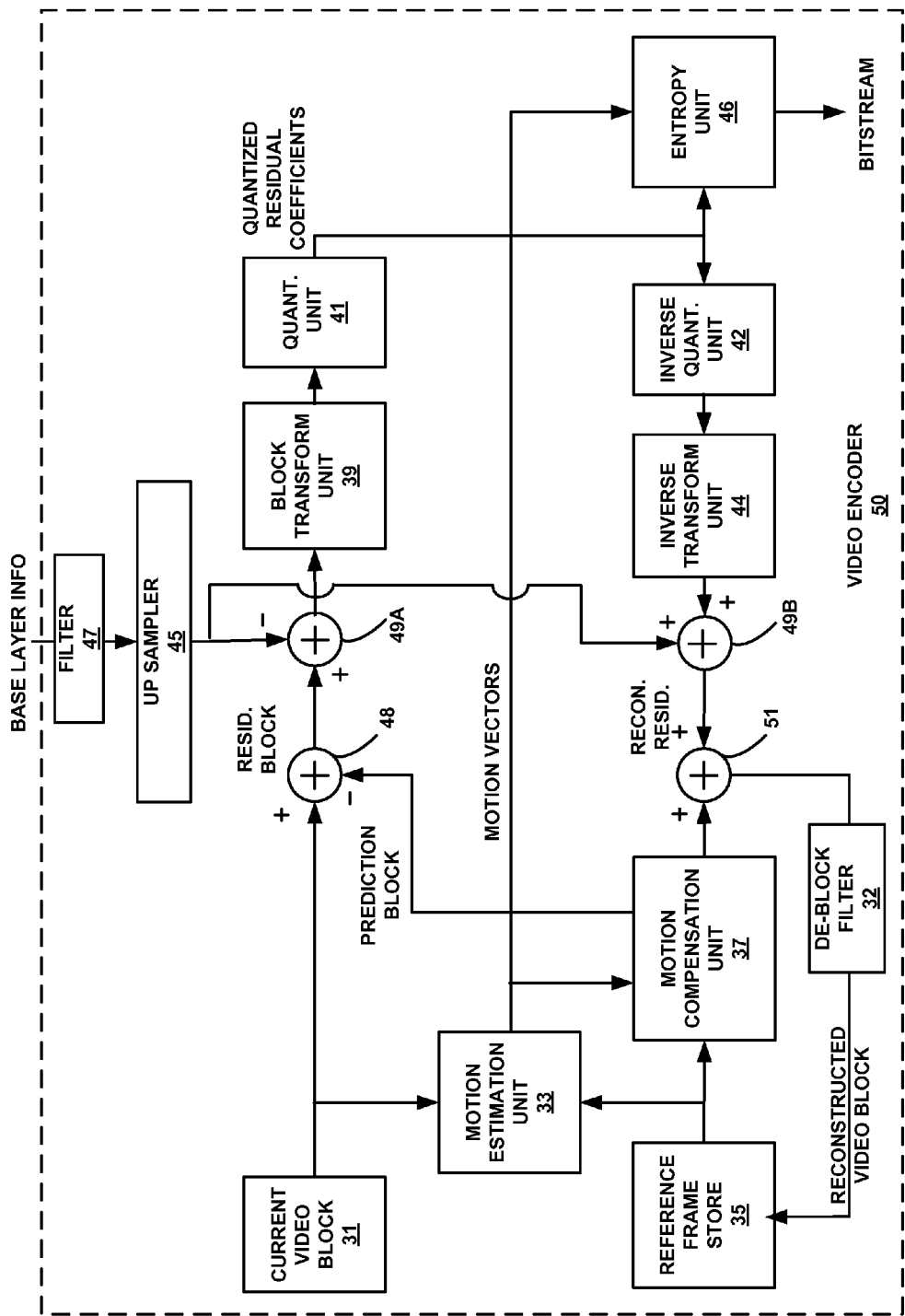
FIG. 2 a block diagram illustrating an example of a video encoder consistent with this disclosure.

FIG. 2 is a block diagram illustrating an example of a video encoder 50 that includes an upsampler 45 to upsample base layer video data to a spatial resolution associated with enhancement layer video data. The upsampled data is then used to code enhancement layer video data. Video encoder 50 may correspond to enhancement layer encoder 34 of source device 12 in FIG. 1. That is to say, base layer encoding components are not illustrated in FIG. 2 for simplicity. Therefore, video encoder 50 may be considered an enhancement layer encoder. In some cases, the illustrated components of video encoder 50 could also be implemented in combination with base layer encoding modules or units, e.g., in a pyramid encoder design that supports scalable video coding of the base layer and the enhancement layer.

Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames. For intra-coding, spatial prediction using pixels from neighboring blocks within the same frame is applied to form a predictive block for the block being coded. Spatial prediction components used for intra-coding are not illustrated in FIG. 2.

As shown in FIG. 2, video encoder 50 receives a current video block 31 (e.g., an enhancement layer video block) within a video frame to be encoded. In the example of FIG. 2, video encoder 50 includes motion estimation unit 33, reference frame store 35, motion compensation unit 37, block transform unit 39, upsampler 45, quantization unit 41, inverse quantization unit 42, inverse transform unit 44 and entropy coding unit 46. A deblocking filter 32 may also be included to filter block boundaries to remove blockiness artifacts. Video encoder 50 also includes summer 48, summers 49A and 49B, and summer 51. FIG. 2 illustrates the temporal prediction components of video encoder 50 for inter-coding of video blocks. Although not shown in FIG. 2 for ease of illustration, video encoder 50 also may include spatial prediction components for intra-coding of some video blocks.

Motion estimation unit 33 compares video block 31 to blocks in one or more adjacent video frames to generate one or more motion vectors. The adjacent frame or frames may be retrieved from reference frame store 35, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 33 identifies a block in an adjacent frame that most closely matches the current video block 31, e.g., based on a rate distortion model, and determines a displacement between the blocks. On this basis, motion estimation unit 33 produces a motion vector (MV) (or multiple MV's in the case of bidirectional prediction) that indicates the magnitude and trajectory of the displacement between current video block 31 and a predictive block used to code current video block 31.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 37. Motion estimation unit 33 may identify the best motion vector for a video block using a rate-distortion model. Using the resulting motion vector, motion compensation unit 37 forms a prediction video block by motion compensation.

Video encoder 50 forms a residual video block by subtracting the prediction video block produced by motion compensation unit 37 from the original, current video block 31 at summer 48. Block transform unit 39 applies a transform, such as a discrete cosine transform (DCT), to the residual block, producing residual transform block coefficients. At this point, further compression is applied by subtracting base layer residual information from the enhancement layer residual information using adder 49A. Upsampler 45 receives base layer residual information (e.g., from a base layer encoder) and upsamples the base layer residual information to generate upsampled information. This upsampled information is then subtracted (via adder 49A) from the enhancement layer residual information being coded.

As described in greater detail below, upsampler 45 can identify situations in which interpolation is preferred, and other situations in which so-called "nearest neighbor" copying techniques are preferred. Interpolation involves the generation of a weighted average for an upsampled value, wherein the weighted average is defined between two values of the base layer. For nearest neighbor copying, the upsampled value is defined as that of the base layer pixel location in closest spatial proximity to the upsampled pixel location. According to this disclosure, upsampler 45 uses interpolation in specific scenarios of the upsampling, and nearest neighbor techniques in other scenarios. In particular, the decision by upsampler 45 whether to perform interpolation or nearest neighbor techniques may be based on whether the upsampled value corresponds to an edge pixel location in the enhancement layer. This contrasts with conventional upsampling techniques, which generally consider only the base layer pixel locations in determining whether to interpolate or use nearest neighbor techniques. The interpolation and nearest neighbor examples in this disclosure are described in one-dimension, for simplicity, but such one-dimension interpolation or nearest neighbor techniques would typically be applied sequentially in both the horizontal and vertical dimensions. An additional filter 47 may also be included to filter block edges of the base layer information prior to upsampling by upsampler 45. Although depicted in FIG. 2 as being located prior to upsampler 45, the additional filter 47 could also be placed after upsampler 45 to filter those pixel locations in the upsampled video data that are interpolated from two base layer pixels that correspond to two different base layer coding blocks. In either case, this additional filtering by filter 47 is optional, and is addressed in greater detail later in this disclosure.

Quantization unit 41 quantizes the residual transform block coefficients to further reduce bit rate. Summer 49A receives the upsampled information from upsampler 45 and is positioned between summer 48 and block transform unit 39. In particular, summer 49A subtracts an upsampled block of data from the output of block transform unit 39. In a similar fashion, summer 49B, which is positioned between inverse transform unit 44 and summer 51, also receives the upsampled information from upsampler 45. Summer 49B adds the upsampled block of data back to the output of inverse transform unit 44.

Spatial prediction coding operates in a manner very similar to temporal prediction coding. However, whereas temporal prediction coding relies on blocks of adjacent frames (or other coded units) to perform the coding, spatial prediction relies on blocks within a common frame (other coded unit) to perform the coding. Spatial prediction coding codes intra-coded blocks, while temporal prediction coding codes inter-coded blocks. Again, the spatial prediction components are not shown in FIG. 2 for simplicity.

Entropy unit 46 codes the quantized transform coefficients according to an entropy coding technique, such as variable length coding, binary arithmetic coding (CABAC), Huffman coding, run-length coding, coded block pattern (CBP) coding, or the like, in order to further reduce the bit rate of transmitted information. Entropy unit 46 may select a VLC table to promote coding efficiency. Following the entropy coding, the encoded video may be transmitted to another device. In addition, inverse quantization unit 42 and inverse transform unit 44 apply inverse quantization and inverse transformation, respectively, to reconstruct the residual block. Summer 49B adds back the upsampled data from upsampler 45 (which represents an upsampled version of the base layer residual block), and summer 51 adds the final reconstructed residual block to the motion compensated prediction block produced by motion compensation unit 37 to produce a reconstructed video block for storage in reference frame store 35. De-block filter 32 can perform deblock filtering prior to storing the reference frame. De-block filtering may be optional in some examples.

According to this disclosure, upsampler 45 interpolates values for one or more pixel locations of the upsampled video blocks that correspond to a location between two different edges of two different base layer video blocks.

In one example, upsampler 45 interpolates first values for the upsampled video data based on the base layer video data for: (i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks, and (ii) pixel locations of the upsampled video data that correspond to edge pixel locations of the enhancement layer video blocks and are not located between the different base layer video blocks. Upsampler 45 may define second values for the upsampled video data based on values of nearest neighbors in the base layer video data for: (iii) pixel locations of the upsampled video data that correspond to edge pixel locations of the enhancement layer video blocks and are located between the different base layer video blocks.

In another example, upsampler 45 interpolates first values for the upsampled video data based on the base layer video data for: (i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks, and (ii) pixel locations of the upsampled video data that correspond to edge pixel locations of the enhancement layer video blocks and are not located between the different base layer video blocks. In this case, upsampler 45 may define second values for the upsampled video data based on values of nearest neighbors in the base layer video data for: (iii) pixel locations of the upsampled video data that correspond to edge pixel locations of the enhancement layer video blocks and are located between the different base layer video blocks, and (iv) pixel locations of the upsampled video data that correspond to internal pixel locations of the enhancement layer video blocks and are located between the different base layer video blocks when the two different base layer video blocks define different coding modes. The different coding modes may comprise an intra coding mode and an inter coding mode. In this case, upsampler 45 considers not only the locations associated with the upsampled values (i.e., whether the upsampled values correspond to block boundaries in the enhancement layer and whether the values fall between block boundaries in the base layer), but also whether the two base layer video blocks are coded using different coding modes (e.g., inter or intra coding modes).

Figure 3:
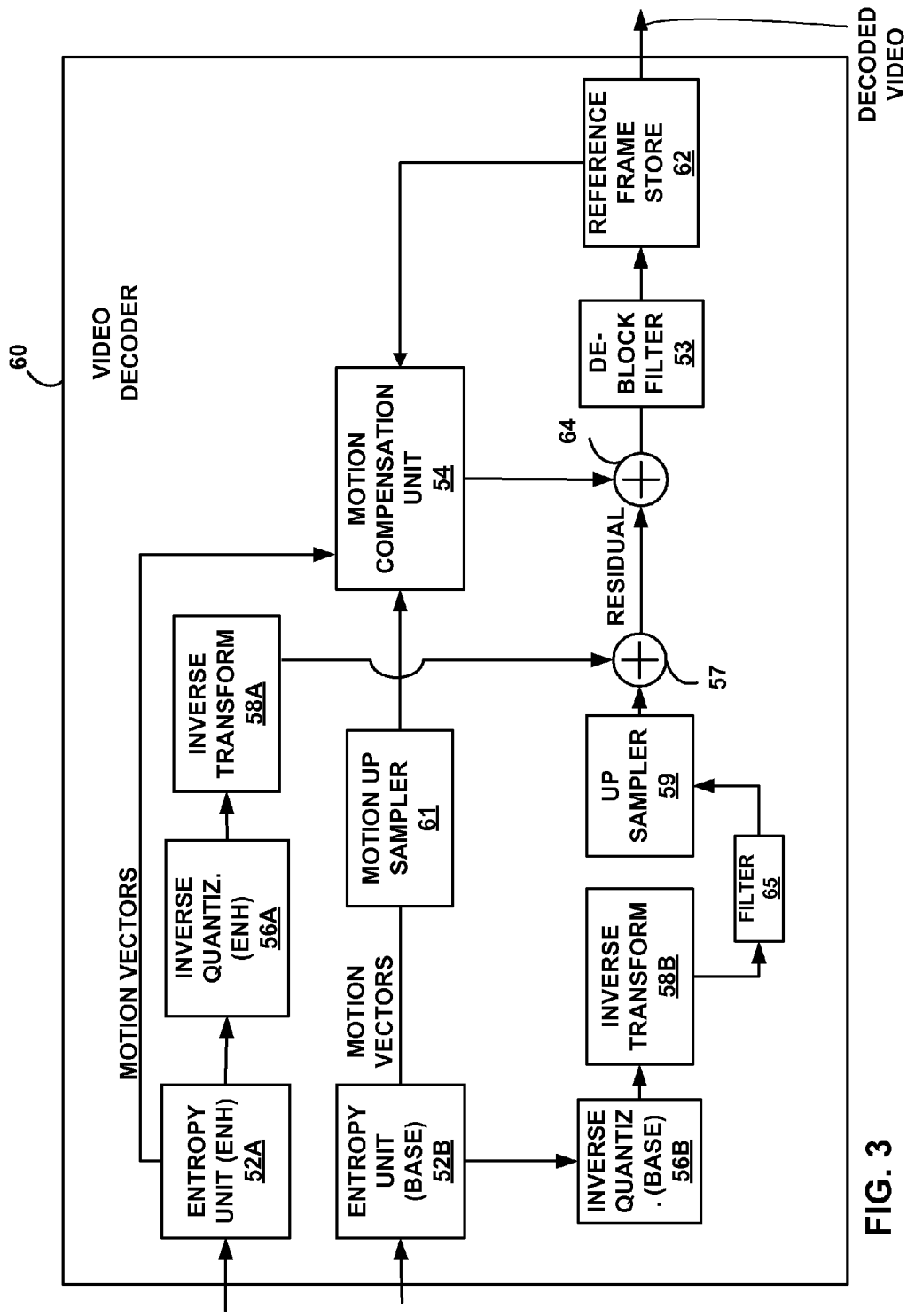
FIG. 3 is a block diagram illustrating an example of a video decoder consistent with this disclosure.

FIG. 3 is a block diagram illustrating an example of a video decoder 60, which may correspond to video decoder 28 of FIG. 1, or a decoder of another device. Video decoder 60 includes an upsampler 59, which performs similar functions to those of upsampler 45 of FIG. 2. That is to say, like upsampler 45, upsampler 59 interpolates values for the upsampled video blocks for one or more pixel locations of the enhancement layer video blocks that correspond to a location between two different edges of two different base layer video blocks. In addition, like upsampler 45, upsampler 59 may select between interpolation and nearest neighbor copying in the manner described herein. A motion upsampler 61 may also be used to upsample the motion vectors associated with the base layer. An optional filter 65 may also be used to filter block boundaries of the base layer data prior to upsampling performed by upsampler 59. Although not depicted in FIG. 3, filter 65 may also be placed after upsampler 59 and used to filter those pixel locations in the upsampled video data that are interpolated from two base layer pixels that correspond to two different base layer coding blocks.

Video decoder 60 may include an entropy unit 52A for entropy decoding of enhancement layer information, and may include another entropy unit 52B for entropy decoding of base layer information. Intra prediction components are not shown in FIG. 3, but could be used if video decoder 60 supported intra and inter prediction coding. The enhancement layer path may include inverse quantization unit 56A and inverse transform unit 58A, and the base layer path may include inverse quantization unit 56B and inverse transform unit 58B. The information in the base layer and enhancement layer paths may be combined by adder 57. Prior to such combination, however, the base layer information is upsampled by upsampler 59 according to the techniques described herein.

Video decoder 60 may perform an inter-decoding of blocks within video frames. In the example of FIG. 3, video decoder 60 includes entropy units 52A and 52B, motion compensation unit 54, inverse quantization units 56A and 56B, inverse transform units 58A and 58B, and reference frame store 62. Video decoder 60 also includes summer 64. Video decoder 60 may also include a de-block filter 53 that filters the output of summer 64. Again, summer 57 combines information in the base layer and enhancement layer paths following upsampling of the base layer path via upsampler 59. Motion upsampler 61 may upsample the motion vectors associated with the base layer so that such motion vectors correspond to the spatial resolution of the enhancement layer video data.

For enhancement layer video blocks, entropy unit 52A receives the encoded video bitstream and applies an entropy decoding technique to decode the information. This may produce quantized residual coefficients, macroblock and sub-block coding mode and motion information, which may include motion vectors and block partitions. Following the decoding performed by entropy unit 52A, motion compensation unit 54 receives the motion vectors and one or more reconstructed reference frames from reference frame store 62. Inverse quantization unit 56A inverse quantizes, i.e., de-quantizes, the quantized block coefficients and inverse transform unit 58A applies an inverse transform, e.g., an inverse DCT, to the coefficients to produce residual blocks. The output of inverse transform unit 58A is combined with the upsampled base layer information as the output of upsampler 59. Adder 57 facilitates this combination. Motion compensation unit 54 produces motion compensated blocks that are summed by summer 64 with the residual blocks to form decoded blocks. De-block filter 53 filters the decoded blocks in order to remove blockiness artifacts. The filtered blocks are then placed in reference frame store 62, which provides reference blocks from motion compensation and also produces decoded video to a drive display device (such as device 30 of FIG. 1).

SVC may support a number of inter-layer prediction techniques to improve coding performance. For example, when coding an enhancement layer macroblock, the corresponding macroblock mode, motion information, and residual signals from the base or previous layer may be used. In particular, certain residual blocks in the base or previous layer may be correlated to the corresponding enhancement layer residual blocks. For these blocks, applying residual prediction may reduce the enhancement layer residual energy and improve coding performance.

In SVC, whether residual prediction is used or not may be indicated using a one-bit flag ResPred associated with the macroblock, which may be coded as a macroblock level syntax element. If ResPred=1, then the enhancement layer residual is coded after subtracting from it the base layer residual block. When the enhancement layer bitstream represents a video signal with higher spatial resolution, the base layer residual signal is upsampled to the resolution of the enhancement layer before being used in inter-layer prediction. This is the function of upsamplers 45 and 59 in FIGS. 2 and 3, i.e., generation of the upsampled video blocks. In SVC Joint Draft 8 (JD8), a bilinear filter is proposed for the upsampler in order to upsample the base layer residual signal, with some exceptions on base layer block boundaries.

SVC JD8 supports both dyadic spatial scalability and extended spatial scalability (ESS). In dyadic spatial scalability, the enhancement layer video frame is twice as large as the base layer video in each dimension and cropping, if any, happens on macroblock boundaries. In ESS, arbitrary scaling ratios and cropping parameters between the base and the enhancement layer video signal are allowed. When ESS is used, pixel alignment between the base and the enhancement layers may be arbitrary.

Figure 4:
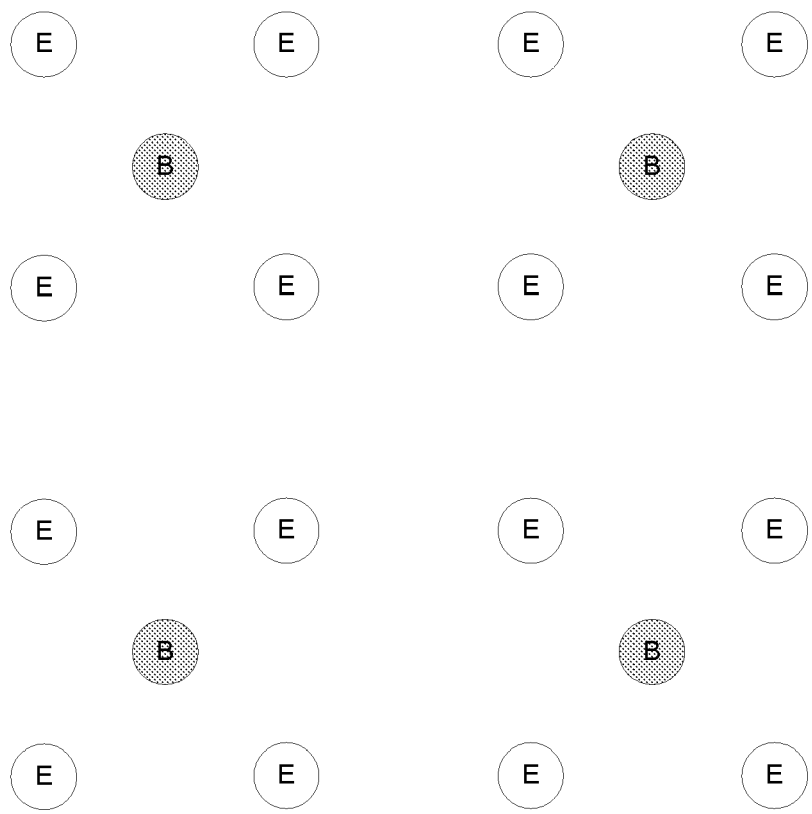
FIGS. 4 and 5 are conceptual diagrams illustrating upsampling from a base layer to an enhancement layer.
Figure 5:
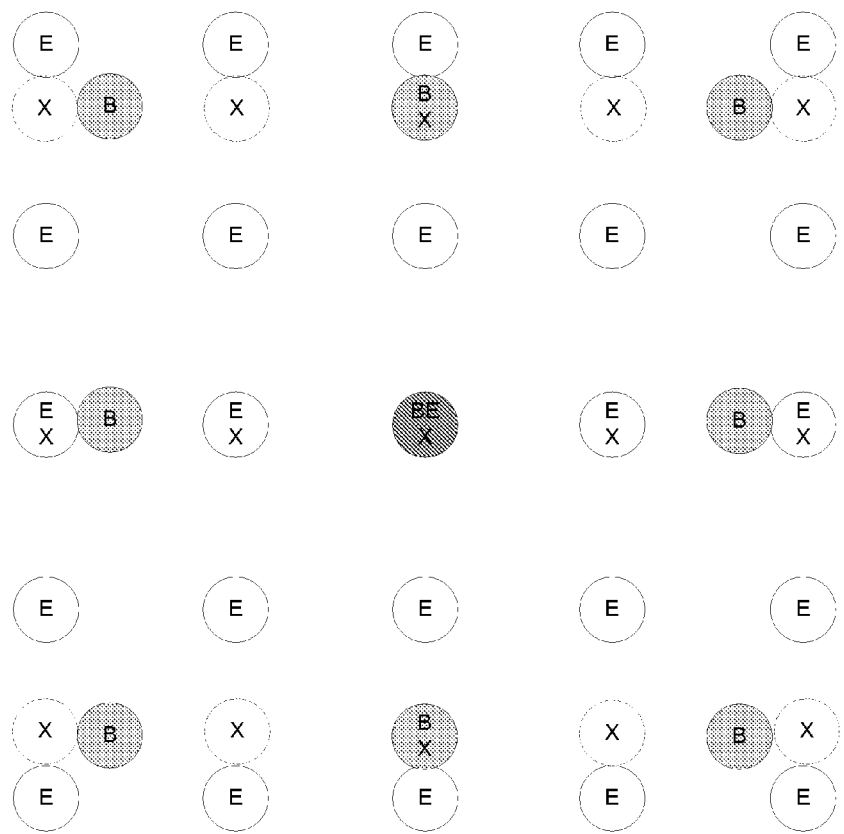

FIGS. 4 and 5 give examples of the relative positioning of pixels in the base layer and the enhancement layer for scaling ratios of 2:1 and 5:3, respectively. In FIGS. 4 and 5, the labels "B" refer to pixel locations associated with a base layer, and the labels "E" refer to locations associated with an upsampled data (which corresponds to that of the enhancement layer). The upsampled video block(s) are used as a reference in coding the enhancement layer information. The label "B E" in the center pixel location of FIG. 5 means that the same pixel location overlaps in the base layer and in the upsampled data that has a resolution of the enhancement layer.

As shown in FIGS. 4 and 5, upsampling from a lower resolution base layer to the higher resolution of the enhancement layer occurs in two dimensions. This two dimensional upsampling, however, can be easily done via successive one-dimensional upsampling processes for each pixel location. For example, in FIG. 5, the 3×3 pixel array of base layer video data (labeled B) is first upsampled in the horizontal direction to become a 5×3 pixel array of intermediate values (labeled X). Then, the 5×3 pixel array X is upsampled in the vertical direction to become the final 5×5 pixel array of upsampled video data that correspond to the enhancement layer spatial resolution (labeled E). Note that in FIG. 5, the upsampled pixel location and the location of the pixel before upsampling may be co-located; for example, the center pixel is labeled three times as B, E and X. During the horizontal and vertical upsampling processes, the decision as to whether to use interpolation or nearest neighbor copying may be applied according to this disclosure.

In the following discussion, interpolation and nearest neighbor copying techniques are discussed in the horizontal dimension. It is understood, however, that successive linear techniques could be applied in vertical and horizontal directions for two dimensional upsampling.

Figure 6:
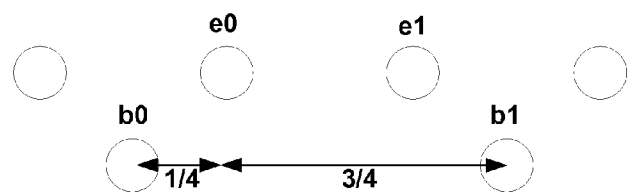
FIGS. 6-8 are conceptual diagrams illustrating upsampling techniques that may be used according to this disclosure.

When spatial scalability is used, the base layer residual signal is upsampled. The generated upsampled data has the same spatial dimension as the enhancement layer video information, and is used as prediction data for the enhancement layer residual. Again, SVC JD8 proposes the use of a bilinear filter for this upsampling. For dyadic spatial scalability, the pixel distances used to derive weights in bilinear upsampling in the horizontal direction are shown in FIG. 6. Bilinear upsampling in the vertical dimension is done in the same manner as the horizontal direction.

FIG. 6 shows a row of pixels in a base layer block and a row of pixels in an upsampled block corresponding to the spatial resolution of an enhancement layer. As shown in FIG. 6, the upsampled residual values p(e0) and p(e1) at pixel locations e0 and e1 are derived according to equations (1) and (2), where b0 and b1 are the nearest integer pixel locations in the base layer.

$$p(e0)=(1-\tfrac{1}{4})*p(b0)+\tfrac{1}{4}*p(b1) \qquad (1)$$

$$p(e1)=(1-\tfrac{3}{4})*p(b0)+\tfrac{3}{4}*p(b1) \qquad (2)$$

Figure 7:
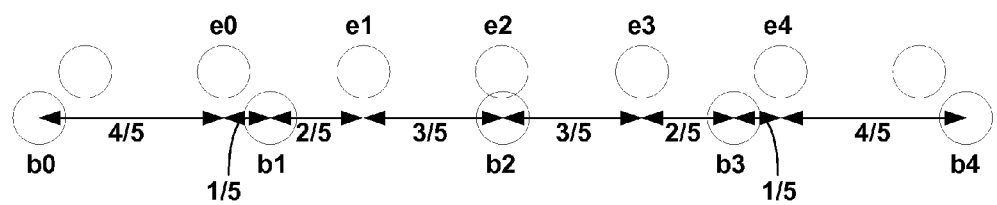

For ESS with scaling ratio 5:3, the weights used in bilinear upsampling in the horizontal direction are shown in FIG. 7. Again, bilinear upsampling in the vertical dimension is done in the same manner as the horizontal direction.

In FIG. 7, the upsampled residual values p(e0) to p(e4) at pixel locations e0 to e4 are derived as in equations (3) to (7), where b0 to b4 are integer pixel locations in the base layer used in the interpolation and e0 to e4 are pixel locations in the upsampled layer, which corresponds to the spatial resolution of the enhancement layer.

$$p(e0)=(1-\tfrac{1}{3})*p(b0)+\tfrac{1}{3}*p(b1) \tag{3}$$

$$p(e1)=(1-\tfrac{2}{3})*p(b1)+\tfrac{2}{3}*p(b2) \tag{4}$$

$$p(e2)=p(b2) \tag{5}$$

$$p(e3)=(1-\tfrac{3}{3})*p(b2)+\tfrac{3}{3}*p(b3) \tag{6}$$

$$p(e4)=(1-\tfrac{1}{3})*p(b3)+\tfrac{1}{3}*p(b4) \tag{7}$$

Discontinuity across block edges exists in the reconstructed residual signal in the base layer. The locations where the discontinuity exists depend on the transform size used to code the base layer video. When a 4×4 block transform is used, discontinuity exists on 4×4 block boundaries. When an 8×8 block transform is used, discontinuity exists on 8×8 block boundaries. In JD8, if the two base layer pixels used in bilinear interpolation (e.g., b0 and b1 in FIG. 6) belong to two different blocks, then bilinear interpolation is disabled. Instead, the upsampled values are derived by copying from the nearest neighbor pixel in the base layer.

In the example of dyadic spatial scalability in FIG. 6, if pixels at location b0 and b1 belong to two blocks, then pixels at e0 and e1 are derived using equations (8) and (9) instead of (1) and (2):

$$p(e0)=p(b0) \tag{8}$$

$$p(e1)=p(b1) \tag{9}$$

Figure 8:
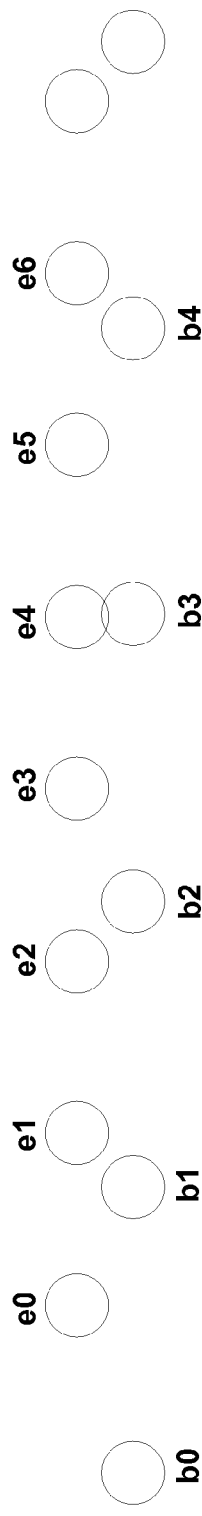

In ESS, coding block boundaries in the base layer are not aligned with the coding block boundaries in the enhancement layer. Therefore, an upsampled block corresponding to the enhancement layer resolution may contain pixels interpolated from different base layer coding blocks. For ESS with 5:3 spatial ratio (FIG. 7), an example of block alignment may be found as in FIG. 8. In FIG. 8, pixels B0-B3 belong to one base layer coding block and pixels B4-B5 belong to a different base layer coding block (assuming 4×4 transform is used). In this case, signal discontinuity may exist between pixels B3 and B4. In the upsampled layer, which corresponds to the spatial resolution of the enhancement layer, pixels E0-E4 are interpolated or copied from base layer pixels B0-B3, and pixels E5-E7 are interpolated or copied from base layer pixels B3-B5. Assuming the upsampled pixels labeled e0 through e7 belong to one 8×8 upsampled coding block, signal discontinuity from the base layer will be carried over into the 8×8 upsampled layer. In particular, because base layer pixels at b3 and b4 belong to two base layer blocks, according to conventional techniques, the upsampled pixel at location e5 will be copied from the base layer pixel at location b4 instead of being interpolated from pixels at b3 and b4. This forced copy (per conventional techniques defined in JD8) may aggravate the problem of signal discontinuity within the 8×8 enhancement layer block. This, in turn, may translate into less accurate residual prediction.

In this disclosure, an adaptive residual upsampling scheme is outlined. The adaptive residual upsampling scheme may alleviate the signal discontinuity within an upsampled block of data by taking into account the relative block alignment between the base layer and the enhancement layer. To further improve the upsampled residual signal quality, adaptive low-pass filtering may be applied to the residual signal in the base layer (before upsampling) and/or the residual signal in the enhancement layer (after upsampling). For example, filters 47 and 65 of FIGS. 2 and 3 respectively may comprise low-pass filters that facilitate this filtering of the enhancement layer after upsampling. Although in FIGS. 2 and 3, low-pass filtering is depicted as being applied to the residual signal in the base layer before upsampling, this low-pass filter (elements 47 and 65 in FIGS. 2 and 3) may also be located after upsampler 45 and after upsampler 59, and prior to adder 49A and adder 57.

To summarize, in the residual upsampling process as specified in SVC JD8, for each pixel location in the upsampled data, first the corresponding base layer pixel locations are determined. If the base layer pixels belong to the same base layer coding block in a given direction (horizontal or vertical), then bilinear interpolation in that direction is invoked to obtain the value in the upsampled data. Otherwise (the base layer pixels belong to different base layer coding blocks in a given direction), the value in the upsampled data is determined by copying from the nearest neighboring pixel in the base layer.

Residual upsampling as currently specified in SVC JD8 may aggravate the problem of signal discontinuity within enhancement layer blocks, especially in the case of extended spatial scalability where base and enhancement layer block alignment may be arbitrary. Such signal discontinuity may distort the upsampled signal and reduce its accuracy as the prediction signal when used in residual prediction.

According to this disclosure, the decision as to whether to invoke interpolation or to copy from nearest neighboring pixel may be determined depending on the alignment between the base layer and the enhancement layer blocks. Take FIG. 8 as an example. The enhancement layer pixel corresponding to the location of upsampled pixel e5 lies within an 8×8 coding block at the enhancement layer resolution. In this case, instead of copying from base layer pixel at location b4, or p(e5)=p(b4), bilinear interpolation between the base layer pixels at locations b3 and b4 may be invoked to alleviate signal discontinuity and improve prediction accuracy. That is, the upsampled pixel value at e5 may be derived using equation (10):

$$p(e5)=(1-\tfrac{3}{5})*p(b3)+\tfrac{3}{5}*p(b4) \tag{10}$$

Copying from nearest neighboring pixel may be invoked only when both of the following conditions are true:
C1. The upsampled pixel to be interpolated lies on the enhancement layer coding block boundary; and
C2. The base layer pixels involved in the interpolation process belong to different base layer coding blocks.

A video coding system may support more than one block transform. For example, in H.264/AVC, both 4×4 and 8×8 integer block transforms are supported for luma block, while for only 4×4 transform is applied to chroma block. For chroma component, there is additional DC transform on DC coefficients of the 4×4 blocks. Since this does not change the fact that the blocky artifacts happen at 4×4 block boundaries, this transform is not considered in the discussion of this disclosure.

The block transform that is applied to the residual signal is encoded in the video bitstream as a macroblock-level syntax element. In the context of SVC, the block transform type applied to the base layer coding block is known to both the encoder and the decoder when residual upsampling is carried out. For the enhancement layer, the decoder may know the block transform type used to code the enhancement layer residual. However, at the encoder side, when the base layer residual signal is being upsampled, the actual block transform that will be used to code the enhancement layer residual is not yet known. One solution is to upsample the base layer residual based on the rules defined above differently for the different block transform types tried in the mode decision process.

Two alternative methods may be used to alleviate this problem and provide common rules for both the encoder and the decoder to decide the enhancement layer coding block size and therefore identify a coding block boundary:

[Coding block rule A.] The enhancement layer coding block size may be assumed to be 8×8 for the luma component and 4×4 for the chroma components; or

[Coding block rule B.] The enhancement layer coding block size may be assumed to be 8×8 for both the luma and the chroma components.

Once coding blocks in the base layer and in the enhancement layer are decided using either of the above rules, whether the pixel(s) involved in the interpolation process lie on coding block boundaries may be decided as follows:

a. A base layer pixel to be used in interpolation of an upsampled pixel may be considered to lie on the base layer coding block boundary in a given direction (either horizontal or vertical) if it is either the last pixel within a base layer coding block or if it is the first pixel within a base layer coding block.

b. An upsampled pixel to be interpolated may be considered to lie on the enhancement layer block boundary in a given direction (either horizontal or vertical) if it is the last pixel within an enhancement layer coding block or if it is the first pixel within an enhancement layer coding block.

These rules consider the coding block boundary to be 1 pixel wide on each side. However, the coding block boundary may be considered to have widths other than 1 pixel on each side. Furthermore, the base layer and the enhancement layer may have different definitions of coding block boundaries. For example, the base layer may define coding block boundary to be one pixel wide on each side, while the enhancement layer may define coding block boundary to be wider than one pixel on each side, or vice versa.

It is noteworthy that the scope of this disclosure is not limited by the use of bilinear interpolation. The upsampling decision based on block alignment between the base layer and the enhancement layer may be applied to any interpolation scheme. The 2:1 and 5:3 spatial ratios, as well as the corresponding block alignments for these ratios, and the corresponding weights given in the interpolation equations, are provided above as examples, but are not meant to limit the scope of this disclosure. Furthermore, the disclosed scheme may be applied to residual upsampling in other video coding systems and/or standards where coding block size other than 4×4 and 8×8 may be used. Interpolation may also use weighted averages of several pixels located on either side of the pixel to be interpolated.

To further alleviate the problem of signal discontinuity across block boundaries in the base layer residual that may show up as internal pixels within upsampled data, before upsampling, low-pass filtering on the base layer residual signal may reduce this discontinuity and improve the quality of the upsampled residual. For example, operation in equations (11) and (12) may be carried out on the pixel values at locations b3 and b4 in the base layer before equation (13) is applied to obtain the pixel value at e5 in FIG. 8. Again, this could be implemented via filters 47 and 65 (e.g., low-pass filters) located prior to upsampler 45 (FIG. 2) or upsampler 59 (FIG. 3).

$$\hat{p}(b3) = \frac{1}{4} * p(b2) + \frac{1}{2} * p(b3) + \frac{1}{4} * p(b4) \quad (11)$$

$$\hat{p}(b4) = \frac{1}{4} * p(b3) + \frac{1}{2} * p(b4) + \frac{1}{4} * p(b5) \quad (12)$$

$$\hat{p}(e5) = (1 - \frac{3}{5}) * \hat{p}(b3) + \frac{3}{5} * p(b4) \quad (13)$$

In equations (11) and (12), the [1,2,1] smoothing filter is used as an example. Alternatively, a modified low-pass filter with less smoothing effect, for example, with tap coefficients [1,6,1] instead of [1,2,1], may be used in (11) and (12). Furthermore, an adaptive low-pass filter that adjusts the filtering strength depending on the nature and the magnitude of the base layer discontinuity may be applied to the base layer residual signal before upsampling is carried out. The low-pass filter may be applied only to the pixels at the base layer block boundaries (b3 and b4 in FIG. 8), or, alternatively, it may be applied also to pixels close to the block boundaries (e.g., b2 and b5 in FIG. 8).

The decision as to whether to apply low-pass filter to the base layer signal before upsampling may be based on the locations of the enhancement layer and base layer pixels involved. For example, the additional low-pass filter may be applied to the base layer pixels if both of the following conditions are true:

1. The base layer pixels to be used in the interpolation process belong to different base layer coding blocks;
2. The upsampled pixel to be interpolated corresponds to an internal pixel within an enhancement layer coding block. The upsampled coding block may be determined using either coding block rule A or coding block rule B explained above.

Another way to reduce signal discontinuity at the pixels internal to an upsampled coding block is to apply low-pass filter to the upsampled signal after interpolation. This may be accomplished by re-ordering the filters 47 and 65 in FIG. 2 and FIG. 3 to be applied after upsamplers 45 and 59. Using the pixel at location e5 in FIG. 8 as an example, after p(e5) is obtained using equations (10) and (11), the following may be applied:

$$\hat{p}(e5) = \frac{1}{4} * p(e4) + \frac{1}{2} * p(e5) + \frac{1}{4} * p(e6) \quad (14)$$

In equation (14), p(e4) and p(e6) are the upsampled pixel values at locations e4 and e6. Again, the [1,2,1] smoothing filter is used as example. Alternative low-pass filtering may also be applied. For example, a modified smoothing filter with tap coefficients [1,6,1] may be applied. Alternatively, adaptive low-pass filtering based on the nature and magnitude of the signal discontinuity may be applied.

The decision whether to apply additional low-pass filter may be based on the locations of the upsampled pixels and base layer pixels involved. For example, additional low-pass filter may be applied if both of the following conditions are true:

1. The upsampled pixel corresponds to an internal pixel within an enhancement layer coding block. The enhancement layer coding block may be determined using either coding block rule A or coding block rule B (as set forth above) or any other coding block rules; and
2. The base layer pixels used in the interpolation process belong to different base layer coding blocks.

SVC supports residual prediction to improve coding performance in the enhancement layer. In spatial scalability, the base layer residual signal is upsampled before being used in residual prediction. Signal discontinuity across base layer coding blocks may exist in the base layer residual, and this signal discontinuity may be carried over into the upsampled signal. In the case of ESS, the locations where this inherited discontinuity may show up may be arbitrary. To improve the quality of the upsampled signal, an adaptive residual upsampling scheme for scalable video coding is discussed in this disclosure.

During residual upsampling, the existing scheme in SVC JD8 prevents interpolation between pixels from different base layer coding blocks. In contrast, with the proposed adaptive upsampling scheme of this disclosure, the relative block alignment between the base layer and the enhancement layer may be considered in the upsampling process. In particular, when the pixel to be upsampled corresponds to an internal pixel of an enhancement layer coding block, interpolation rather than copying from a nearest neighboring pixel may be used to reduce signal discontinuity within an enhancement layer coding block.

Also, as noted above, additional low-pass filtering may be applied on the residual signal both before and after interpolation to further reduce signal discontinuity that may exist within an enhancement layer coding block. In particular, if an upsampled pixel corresponds to an internal pixel of the corresponding enhancement layer coding block, and the base layer pixels involved lie on or close to the base layer coding block boundaries, then the following may be applied:

1. Before interpolation, smoothing filter or adaptive low-pass filter may be applied to the base layer pixels that lie on or close to the base layer coding block boundaries;
2. After interpolation, smoothing filter or adaptive low-pass filter may be applied to the enhancement layer pixel that is an internal pixel in an enhancement layer coding block.

Another factor to be considered when deciding whether to invoke interpolation or nearest neighbor copying during residual upsampling is the coding modes (inter coded versus intra coded) of the base layer blocks involved. In SVC, the upsampling is only applied to residual signal from inter coded blocks. In JD8, when a base layer video block is intra coded, its residual signal is reset to zero in the base layer residual image. This entails strong signal discontinuity across base layer residual blocks when the coding mode changes. Therefore, it may be beneficial to not apply interpolation between two base layer pixels if they belong to blocks with different coding modes. In other words, the following decision may be used:

1. If two base layer pixels involved belong to two base layer coding blocks, one of which is intra coded and the other inter coded, then nearest neighbor copying is used.

The above rule may be combined with the adaptive interpolation decision rules based on block alignment as set forth in this disclosure. When combined, the adaptive interpolation decision may become the following:

Copying from nearest neighboring pixel may be invoked when either of the following conditions 1 and 2 is true:

1. If the base layer pixels involved in the interpolation process belong to different base layer coding blocks and the base coding blocks have different coding modes, or
2. Both of the following conditions are true:
   a. The upsampled pixel to be interpolated lies on the enhancement layer coding block boundary.
   b. The base layer pixels involved in the interpolation process belong to different base layer coding blocks.

In the pseudo code below, the underlined conditions may be added to the logic set forth in JD8 during residual upsampling and prediction in order to implement techniques consistent with this disclosure.

```
// Let b0 and b1 be the two base layer pixels used in interpolation
// Let w be the weight parameter used in bilinear interpolation
// Let e be the upsampled pixel to be derived
if (b0 or b1 belongs to an intra-coded base layer coding block OR
    (b0 and b1 belong to two base layer coding blocks AND
    e lies on enhancement layer block boundary))
{
    p(e) = (w > ½) ? p(b1):p(b0)
}
else
{
    p(e) = (1−w)*p(b0)+w*p(b1)
}
```

The base layer block size is the actual block size used in base layer coding. A syntax element FRext may be defined as part of the block header. If FRext is off, then the enhancement layer block size is also known to be 4×4. However, if both 4×4 and 8×8 transforms are allowed (i.e., FRext is turned on) for the enhancement layer, at the encoder side, the block size (i.e., transform size) in the enhancement layer is not yet known when residual upsampling is performed. In this situation (FRext on for enhancement layer), the enhancement layer block size may be assumed to be 8×8 for luma and 4×4 for chroma. That is, for luma, the upsampled pixel at location e is considered to be a block boundary pixel if e=8*m−1 or e=8*m (m is an integer). For chroma, the upsampled pixel at location e is considered to be a block boundary pixel if e=4*m−1 or e=4*m.

For the decoding, no syntax element change is required. The decoding process of JD8 (subclause G.8.10.3) may be modified as follows, with the modifications shown in underlines.

```
For Bilinear interpolation for residual prediction, the Inputs are:
...
A variable blkSize (blkSize = 8 or 4 for luma and blkSize = 4 for chroma)
an array transBlkType[ x, y ] with x = 0..mb − 1 and y = 0..nb − 1
    Output of this process is an array resInterp[ x, y ] with x = 0..m − 1 and
y = ys..ye − 1.
    Let the variable temp1 be derived as follows
        If transBlkIdx[x1, y1] is equal to transBlkIdx[x2, y1] or 0 < (x %
        blkSize) < (blkSize−1) and transBlkType[x1,y1] is equal to
        transBlkType[x2, y2]
            temp1 = r[x1, y1] * ( 16 − ( posX[ x ] % 16 ) ) + r[x2, y1] * ( posX[ x ]
% 16 ) (G-544)
    ...
    Let the variable temp2 be derived as follows.
        If transBlkIdx[x1, y2] is equal to transBlkIdx[x2, y2] or 0 < (x %
        blkSize) < (blkSize−1) and transBlkType[x1, y2] is equal to
        transBlkType[x2, y2]
            temp2 = r[x1, y2] * ( 16 − ( posX[ x ] % 16 ) ) + r[x2, y2] * ( posX[ x ]
```

-continued

```
% 16 ) (G-547)
    ...
    Let resInterp be derived as follows.
        If transBlkIdx[x1, y1] is equal to transBlkIdx[x1, y2] or 0 < (y %
        blkSize) < (blkSize−1) and transBlkType[x1, y1] is equal to
        transBlkType[x1, y2]
            resInterp[x, y] = ( temp1 * ( 16 − ( posY[ y ] % 16 ) ) + temp2 * ( posY[
y ] % 16 ) + ( 128 ) ) >> 8 ) (G-550)
    ...
```

Simulations have been performed according to core experiment 2 (CE2) testing conditions specified in JVT-V302, and the simulations showed peak signal to noise ratio (PSNR) improvements in the video quality when the techniques of this disclosure are used relative to conventional techniques set forth in JD8. In the case of ESS, the proposed small change to residual upsampling provides a very simple and effective way to reduce blocking artifacts in the upsampled residual within an enhancement layer coding block. Simulation results show that the proposed change boosts the coding performance compared to JSVM_7_13 for all CE2 testing conditions. In addition, the proposed scheme greatly improves visual quality by suppressing unpleasant blocking artifacts in the reconstructed enhancement layer video.

Figure 9:
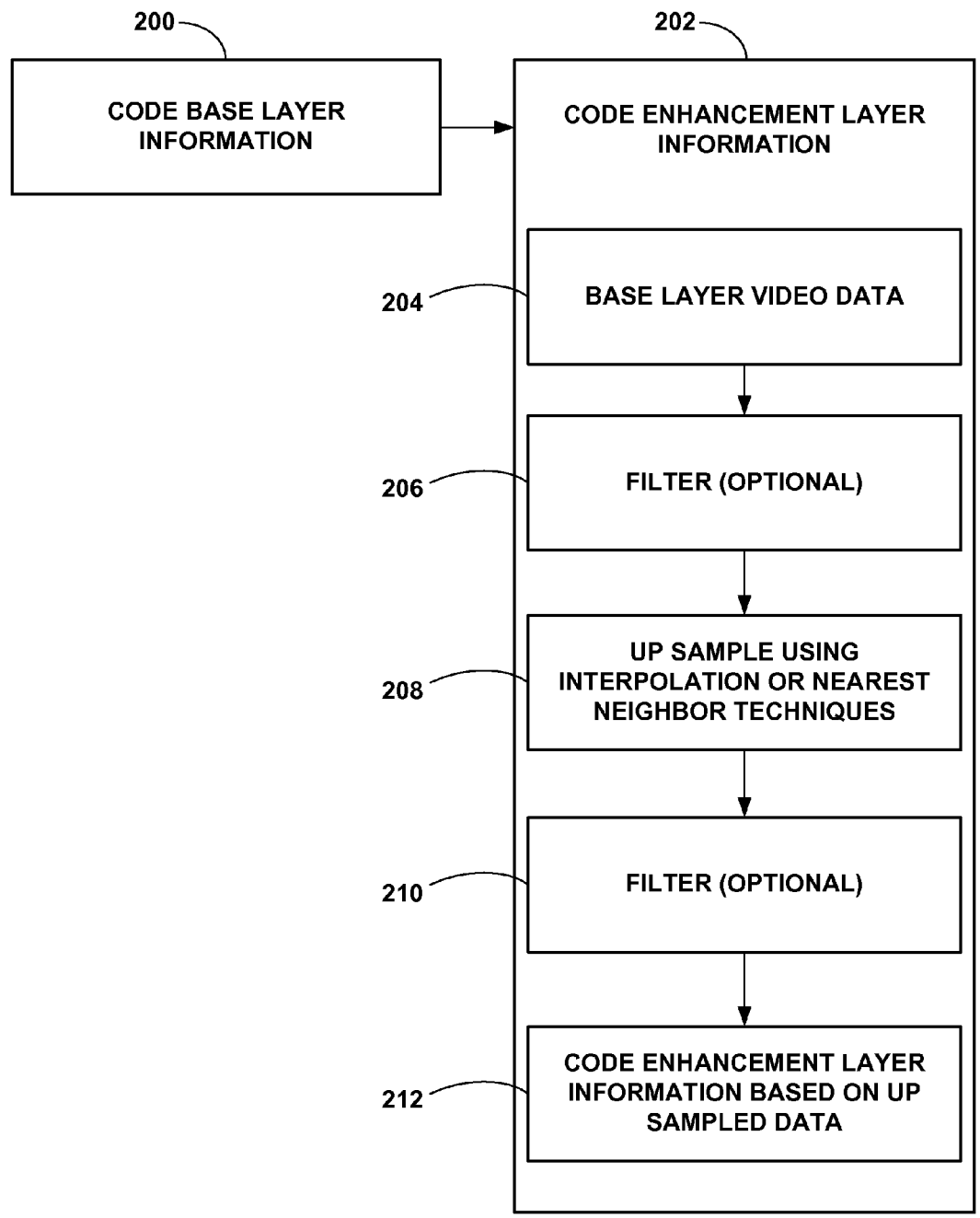
FIG. 9 is a flow diagram illustrating a technique consistent with this disclosure.

FIG. 9 is a flow diagram illustrating a technique consistent with this disclosure. FIG. 9 will be described from the perspective of the encoder, although a similar process would be performed by the decoder. As shown in FIG. 9, base layer encoder 32 codes base layer information (200) and enhancement layer encoder 34 codes enhancement layer information (202). As part of the enhancement layer coding process, enhancement layer encoder 34 (e.g., video encoder 50 shown in FIG. 2) receives base layer information (204). Filter 47 may perform optional filtering of block boundaries of the base layer information (206). Upsampler 45 upsamples the base layer information to generate upsampled video blocks using the various techniques and rules defined herein to select between interpolation or nearest neighbor copying (208). Optional filter 47 may also be applied after the upsampler 45 for the enhancement layer video pixels that are interpolated from base layer block boundary pixels (210) (e.g., pixel e5 in FIG. 8 and equation 14), and video encoder 50 uses the upsampled data to code enhancement layer information (212).

The techniques described in this disclosure may be implemented in one or more processors, such as a general purpose microprocessor, digital signal processor (DSP), application specific integrated circuit (ASIC), field programmable gate array (FPGA), or other equivalent logic devices.

The techniques described herein may be implemented in hardware, software, firmware, or any combination thereof Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The program code may be executed by one or more processors, DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In this disclosure, the term "processor" is meant to cover any combination of one or more microprocessors, DSPs, ASICs, FPGAs, or logic. In addition, in some aspects, the functionality described herein may be provided within dedicated software modules or hardware modules configured for encoding and decoding, or incorporated in a combined video encoder-decoder (CODEC).

If implemented in hardware, this disclosure may be directed to a circuit, such as an integrated circuit, chipset, ASIC, FPGA, logic, or various combinations thereof configured to perform one or more of the techniques described herein.

Various embodiments of the invention have been described. These and other embodiments are within the scope of the following claims.

The invention claimed is:

1. A method for coding video data with spatial scalability, the method comprising:
   generating upsampled video data based on base layer video data, wherein the upsampled video data corresponds to a spatial resolution of enhancement layer video data; and
   coding the enhancement layer video data based on the upsampled video data,
   wherein generating the upsampled video data includes selecting between upsampling via interpolation and upsampling via nearest neighbor copying based on whether a given location associated with the upsampled video data corresponds to an edge pixel location in the enhancement layer and whether the given location associated with the upsampled video data is located between different base layer video blocks defined in the base layer video data.

2. The method of claim 1, wherein the step of generating upsampled video data comprises:
   interpolating first values for the upsampled video data based on the base layer video data for:
   (i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and (ii) pixel locations of the upsampled video data that correspond to edge pixel locations of the enhancement layer video blocks and are not located between the different base layer video blocks; and
  defining second values for the upsampled video data based on values of nearest neighbors in the base layer video data for:
  (iii) pixel locations of the upsampled video data that correspond to edge pixel locations of the enhancement layer video blocks and are located between the different base layer video blocks.

3. The method of claim 1, wherein the step of generating upsampled video data comprises:
  interpolating first values for the upsampled video data based on the base layer video data for:
  (i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and
  (ii) pixel locations of the upsampled video data that correspond to edge pixel locations of the enhancement layer video blocks and are not located between the different base layer video blocks; and
  defining second values for the upsampled video data based on values of nearest neighbors in the base layer video data for:
  (iii) pixel locations of the upsampled video data that correspond to edge pixel locations of the enhancement layer video blocks and are located between the different base layer video blocks; and
  (iv) pixel locations of the upsampled video data that correspond to internal pixel locations of the enhancement layer video blocks and are located between the different base layer video blocks when the two different base layer video blocks define different coding modes.

4. The method of claim 3, wherein the different coding modes comprise an intra coding mode and an inter coding mode.

5. The method of claim 1, wherein the coding step comprises encoding or decoding.

6. The method of claim 1, further comprising the step of filtering pixel values associated with the different base layer video blocks prior to generating the upsampled video data.

7. The method of claim 1, further comprising the step of filtering interpolated values in the upsampled video data that correspond to locations between different base layer video blocks defined in the base layer video data.

8. An apparatus that codes video data with spatial scalability, comprising:
  an upsampler configured to generate upsampled video data based on base layer video data, wherein the upsampled video data corresponds to a spatial resolution of enhancement layer video data; and
  a video coding unit configured to code the enhancement layer video data based on the upsampled video data,
  wherein the apparatus selects between upsampling via interpolation and upsampling via nearest neighbor copying based on whether a given location associated with the upsampled video data corresponds to an edge pixel location in the enhancement layer and whether the given location associated with the upsampled video data is located between different base layer video blocks defined in the base layer video data.

9. The apparatus of claim 8, wherein the upsampler is part of the video coding unit.

10. The apparatus of claim 8, wherein the apparatus comprises a wireless communication device with video coding capabilities.

11. The apparatus of claim 8, wherein the apparatus comprises an integrated circuit.

12. The apparatus of claim 8, wherein the apparatus interpolates first values for the upsampled video data based on the base layer video data for:
  (i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and
  (ii) pixel locations of the upsampled video data that correspond to edge pixel locations of the enhancement layer video blocks and are not located between the different base layer video blocks; and
  defines second values for the upsampled video data based on values of nearest neighbors in the base layer video data for:
  (iii) pixel locations of the upsampled video data that correspond to edge pixel locations of the enhancement layer video blocks and are located between the different base layer video blocks.

13. The apparatus of claim 8, wherein the apparatus includes a filter that filters interpolated values in the upsampled video data that correspond to locations between different base layer video blocks defined in the base layer video data.

14. The apparatus of claim 8, wherein the apparatus is interpolates first values for the upsampled video data based on the base layer video data for:
  (i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and
  (ii) pixel locations of the upsampled video data that correspond to edge pixel locations of the enhancement layer video blocks and are not located between the different base layer video blocks; and
  defines second values for the upsampled video data based on values of nearest neighbors in the base layer video data for:
  (iii) pixel locations of the upsampled video data that correspond to edge pixel locations of the enhancement layer video blocks and are located between the different base layer video blocks; and
  (iv) pixel locations of the upsampled video data that correspond to internal pixel locations of the enhancement layer video blocks and are located between the different base layer video blocks when the two different base layer video blocks define different coding modes.

15. The apparatus of claim 14, wherein the different coding modes comprise an intra coding mode and an inter coding mode.

16. The apparatus of claim 8, wherein the video coding unit comprises:
  a base layer coding unit to encode the base layer video data; and an enhancement layer coding unit to encode the enhancement layer video data, wherein the enhancement layer coding unit includes the upsampler and wherein the upsampler generates the upsampled video data.

17. The apparatus of claim 8, wherein the video coding unit comprises a combined base/enhancement layer decoding unit that decodes the base layer video data and the enhancement layer video data, wherein the combined base/enhancement layer decoding unit includes the upsampler and wherein the upsampler generates the upsampled video data.

18. The apparatus of claim 8, further comprising a filter that filters pixel values associated with the different base layer video blocks prior to the upsampler generating the upsampled video data.

19. A computer-readable medium comprising instructions that upon execution in a processor cause the processor to code video data with spatial scalability, wherein the instructions cause the processor to:
generate upsampled video data based on base layer video data, wherein the upsampled video data corresponds to a spatial resolution of enhancement layer video data; and
code the enhancement layer video data based on the upsampled video data,
wherein generating the upsampled video data includes selecting between upsampling via interpolation and upsampling via nearest neighbor copying based on whether a given location associated with the upsampled video data corresponds to an edge pixel location in the enhancement layer and whether the given location associated with the upsampled video data is located between different base layer video blocks defined in the base layer video data.

20. The computer readable medium of claim 19, wherein the instructions cause the processor to:
interpolate first values for the upsampled video data based on the base layer video data for:
(i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and
(ii) pixel locations of the upsampled video data that correspond to edge pixel locations of the enhancement layer video blocks and are not located between the different base layer video blocks; and
define second values for the upsampled video data based on values of nearest neighbors in the base layer video data for:
(iii) pixel locations of the upsampled video data that correspond to edge pixel locations of the enhancement layer video blocks and are located between the different base layer video blocks.

21. The computer readable medium of claim 19, wherein the instructions cause the processor to filter interpolated values in the upsampled video data that correspond to locations between different base layer video blocks defined in the base layer video data.

22. The computer readable medium of claim 19, wherein the instructions cause the processor to:
interpolate first values for the upsampled video data based on the base layer video data for:
(i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and
(ii) pixel locations of the upsampled video data that correspond to edge pixel locations of the enhancement layer video blocks and are not located between the different base layer video blocks; and
define second values for the upsampled video data based on values of nearest neighbors in the base layer video data for:
(iii) pixel locations of the upsampled video data that correspond to edge pixel locations of the enhancement layer video blocks and are located between the different base layer video blocks; and
(iv) pixel locations of the upsampled video data that correspond to internal pixel locations of the enhancement layer video blocks and are located between the different base layer video blocks when the two different base layer video blocks define different coding modes.

23. The computer readable medium of claim 22, wherein the different coding modes comprise an intra coding mode and an inter coding mode.

24. The computer readable medium of claim 19, wherein coding comprises encoding or decoding.

25. The computer readable medium of claim 19, further comprising instructions that cause the processor to filter pixel values associated with the different base layer video blocks prior to generating the upsampled video data.

26. A device for coding video data with spatial scalability, the device comprising:
means for generating upsampled video data based on base layer video data, wherein the upsampled video data corresponds to a spatial resolution of enhancement layer video data; and
means for coding the enhancement layer video data based on the upsampled video data,
wherein the means for generating the upsampled video data includes means for selecting between upsampling via interpolation and upsampling via nearest neighbor copying based on whether a given location associated with the upsampled video data corresponds to an edge pixel location in the enhancement layer and whether the given location associated with the upsampled video data is located between different base layer video blocks defined in the base layer video data.

27. The device of claim 26, wherein the means for generating upsampled video data comprises:
means for interpolating first values for the upsampled video data based on the base layer video data for:
(i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and
(ii) pixel locations of the upsampled video data that correspond to edge pixel locations of the enhancement layer video blocks and are not located between the different base layer video blocks; and
means for defining second values for the upsampled video data based on values of nearest neighbors in the base layer video data for:
(iii) pixel locations of the upsampled video data that correspond to edge pixel locations of the enhancement layer video blocks and are located between the different base layer video blocks.

28. The device of claim 26, further comprising means for filtering interpolated values in the upsampled video data that correspond to locations between different base layer video blocks defined in the base layer video data.

29. The device of claim 26, wherein the means for generating upsampled video data comprises:

means for interpolating first values for the upsampled video data based on the base layer video data for:

(i) pixel locations of the upsampled video data that correspond to internal pixel locations of enhancement layer video blocks defined in the enhancement layer video data, wherein at least some of the internal pixel locations of the enhancement layer video blocks correspond to locations between the different base layer video blocks; and (ii) pixel locations of the upsampled video data that correspond to edge pixel locations of the enhancement layer video blocks and are not located between the different base layer video blocks; and means for defining second values for the upsampled video data based on values of nearest neighbors in the base layer video data for:

(iii) pixel locations of the upsampled video data that correspond to edge pixel locations of the enhancement layer video blocks and are located between the different base layer video blocks; and (iv) pixel locations of the upsampled video data that correspond to internal pixel locations of the enhancement layer video blocks and are located between the different base layer video blocks when the two different base layer video blocks define different coding modes.

30. The device of claim 29, wherein the different coding modes comprise an intra coding mode and an inter coding mode.

31. The device of claim 26, wherein the means for coding comprises means for encoding or means for decoding.

32. The device of claim 26, further comprising means for filtering pixel values associated with the different base layer video blocks prior to generating the upsampled video data.

* * * * *